United States Patent
Lam et al.

(10) Patent No.: US 6,776,899 B2
(45) Date of Patent: Aug. 17, 2004

(54) CRACKING CATALYST COMPOSITION

(75) Inventors: Yiu Lau Lam, Rio de Janeiro (BR); Anselmo Da Silva Santos, Rio de Janeiro (BR); Rodolfo Eugenio Roncolatto, Rio de Janeiro (BR); Marcelo Andre Torem, Rio de Janeiro (BR); Edisson Morgado, Jr., Rio de Janeiro (BR); Paul O'Connor, Hoevelaken (NL)

(73) Assignees: Akzo Nobel N.V. (NL); Petroleo Brasileiro S.A., Petrobras (BR)

( * ) Notice: Subject to any disclaimer, the term of this patent is extended or adjusted under 35 U.S.C. 154(b) by 147 days.

(21) Appl. No.: 10/079,702

(22) Filed: Feb. 20, 2002

(65) Prior Publication Data

US 2002/0165083 A1 Nov. 7, 2002

(30) Foreign Application Priority Data

Feb. 21, 2001 (BR) .................................. 0100680

(51) Int. Cl.$^7$ ................................................ B01J 29/06
(52) U.S. Cl. .................... 208/120.01; 208/118; 502/64; 502/67; 502/68; 502/71; 502/77; 502/79
(58) Field of Search .................. 502/64, 67, 68, 502/71, 77, 79; 208/118, 120.01

(56) References Cited

U.S. PATENT DOCUMENTS

| 3,758,402 A | | 9/1973 | Oleck et al. ............ 208/111 |
|---|---|---|---|
| 4,867,861 A | * | 9/1989 | Abdo et al. ............. 208/27 |
| 5,098,555 A | | 3/1992 | Chitnis et al. .......... 208/120 |
| 5,100,855 A | | 3/1992 | Clark et al. ............ 502/211 |
| 5,221,648 A | * | 6/1993 | Wachter ................. 502/68 |
| 5,278,114 A | * | 1/1994 | Wielers et al. ......... 502/67 |
| 5,290,744 A | * | 3/1994 | Degnan Jr. et al. ..... 502/67 |
| 5,853,566 A | * | 12/1998 | Kraushaar-Czarnetzki et al. ................. 208/109 |
| 5,905,051 A | * | 5/1999 | Wu et al. .............. 502/60 |
| 5,965,474 A | | 10/1999 | Blako et al. ........... 502/65 |
| 6,045,687 A | * | 4/2000 | Mignard et al. ........ 208/111.3 |
| 6,670,295 B2 | * | 12/2003 | Wang et al. ........... 502/66 |

OTHER PUBLICATIONS

J. Chem. Soc. Chem. Commun. (1994) pp. 967–968 "Improved Stability of MCM–41 through Textural Control". Coustel et al.
J. Phys. Chem. 1995, (1999) pp. 10590–10593 "Thermal Stability of Structural Aluminum in the Mesoporous Molecular Sieve MCM–41". Luan et al.
English translation of Brazilian Patent Application No.:9704925–5A. no date.
International Search Report of International Application No. PCT/EP 02/01785, dated Sep. 27, 2002.

* cited by examiner

Primary Examiner—Kiley Stoner
Assistant Examiner—Christina Ildebrando
(74) Attorney, Agent, or Firm—Louis A. Morris

(57) ABSTRACT

The present invention relates to a cracking catalyst composition comprising a physical mixture of 10–90 weight % of a cracking catalyst A and 90–10 weight % of a cracking catalyst B, whereby catalyst A is a zeolite-containing cracking catalyst, and catalyst B is a catalyst having a higher average pore volume in the pore diameter range of 20–200 Å than catalyst A in the same pore diameter range and not containing M41S material. These compositions can suitably used for the fluid catalytic cracking of hydrocarbon feeds with high metal concentrations.

11 Claims, 2 Drawing Sheets

CRACKING CATALYST COMPOSITION

CROSS REFERENCE TO RELATED APPLICATION

This application claims priority from Brazilian Patent Application No. PI0100680-0, filed Feb. 21, 2001.

BACKGROUND OF THE INVENTION

1. Field of the Invention

This invention relates to a cracking catalyst composition and its use.

2. Prior Art

Typical fluid catalytic cracking (FCC) catalysts comprise a zeolite component. One of the problems frequently encountered in FCC is poisoning of the zeolite by deposition of metals, e.g. nickel and vanadium, which are present in many hydrocarbon feeds that need to be cracked.

One way of dealing with this problem is protection of the zeolite by way of using metal scavengers. Broadly, metal scavengers may contain alkaline earth metal compounds, such as magnesium, calcium, and barium, or clays rich in rare-earth metal compounds. These metal scavengers can be present in the FCC catalyst particles or in separate additive particles, i.e. a physical mixture of FCC catalyst and additive particles. The advantage of using metal scavengers in separate additive particles is that the scavenged metals are kept farther away from the zeolite.

U.S. Pat. No. 5,965,474, incorporated by reference herein, discloses a catalyst composition comprising a conventional faujasite-containing FCC catalyst and an additive comprising a M41S material and incorporated within its pores a metal passivator selected from a rare earth compound, an alkaline earth metal compound, or a combination thereof. M41S material is defined in this reference, as well as in the present specification, as being a non-layered ultra large pore crystalline material exhibiting after calcination an X-ray diffraction pattern with at least one peak at a position greater than about 18 Angstrom Units d-spacing with a relative intensity of 100 and a benzene adsorption capacity of greater than about 15 grams benzene per 100 grams anhydrous crystal at 50 torr and 25° C. An example of an M41S-material is MCM-41.

The catalyst composition according to this document has several drawbacks. First, the preparation of M41S material requires organic templates, which are relatively expensive and can only be completely removed by calcination. Such removal precludes their recycling and leads to environmentally undesired emissions.

Second, M41S materials have relatively low thermal stability. For instance, Z. Luan et al. (J. Phys Chem. 99 (1995) pp. 10590–10593) have shown that structural aluminium is increasingly removed from the MCM-41 structure above 300° C. Moreover, due to the relatively thin walls of these materials their structure readily collapses upon thermal treatment (N. Coustel, et al., J. Chem Soc., Chem. Commun., 1994, pp. 967–968). As FCC processes are generally conducted at elevated temperatures, additives with high thermal stability are desired.

Third, M41S materials have relatively low intrinsic acidity. Due to this relatively low acidity and their relatively low thermal stability, M41S materials have a much lower cracking activity than typical FCC catalysts. Hence, replacement of a part of the FCC catalyst by such additives results in dilution of the catalyst and hence in a reduction in cracking activity.

The present invention provides a cracking catalyst composition with good metal scavenging properties with less or without dilution of the cracking catalyst and having better thermal stability than M41S materials. Moreover, the composition is less expensive than systems based on M41S-materials.

SUMMARY OF THE INVENTION

In one embodiment, the present invention comprises a cracking catalyst composition comprising a physical mixture as separate particles of 10–90 weight % of a cracking catalyst A and 90–10 weight % of a cracking catalyst B, whereby catalyst A is a zeolite-containing cracking catalyst, and cracking catalyst B is a catalyst having a higher average pore volume in the pore diameter range of 20–200 Å than catalyst A in the same pore diameter range. The catalyst composition of the invention does not contain M41S material.

In another embodiment the present invention comprises the use of the above catalyst composition in the fluid catalytic cracking process.

Other embodiments of the invention comprise details including catalyst compositions and physical properties, particularly pore volumes.

DETAILED DESCRIPTION OF THE INVENTION

Within this specification, the term 'cracking catalyst' is defined as a catalyst with a microactivity (MAT), i.e. conversion in the microactivity test, using the general test procedure described below with a catalyst/feed ratio of 5 and after deactivation with steam in the absence of metals, of at least 32%.

As catalyst B has considerable cracking activity, there is no dilution of the cracking activity when using the composition according to the invention compared to the use of a conventional FCC catalyst. Hence, the activity of a cracking catalyst composition according to the invention will be comparable to the activity of a conventional FCC catalyst.

Moreover, the cracking catalyst compositions according to the invention are thermally stable under FCC processing conditions.

The cracking catalyst compositions comprise 10–90 wt. % of cracking catalyst A and 90–10 wt. % of cracking catalyst B, preferably 30–90 wt. % of cracking catalyst A and 70–10 wt. % of cracking catalyst B, more preferably 50–90 wt. % of cracking catalyst A and 50–10 wt. % of cracking catalyst B, and most preferably 65–80 wt. % of cracking catalyst A and 35–20 wt. % of cracking catalyst B.

Preferably, the average pore volume of catalyst B in the pore diameter range 20–200 Å is 1.5 to 6 times, more preferably 2 to 4 times higher than the pore volume of catalyst A in this pore diameter range.

The pore volume of catalyst B in the above pore diameter range is preferably between 0.1 and 0.4 ml/g, more preferably between 0.1 and 0.2 ml/g.

The pore volume in the indicated pore diameter ranges is determined by the B J H (Barrer, Joyner and Halenda)

method, assuming the cylindrical pore model, and using the ASAP 2400 from Micromeritics. The samples are pretreated at 600° C. under vacuum for one hour.

Figure 1:
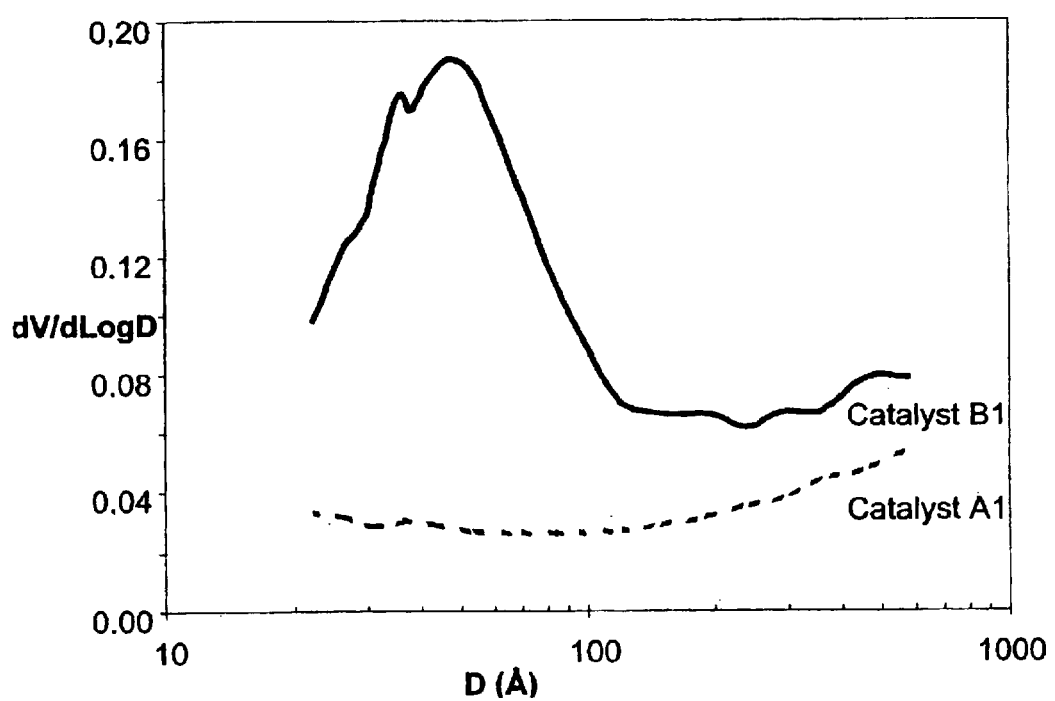
FIG. 1 provides plots of the pore size distributions of catalysts A1 and B1 of Example 1.
Figure 2:
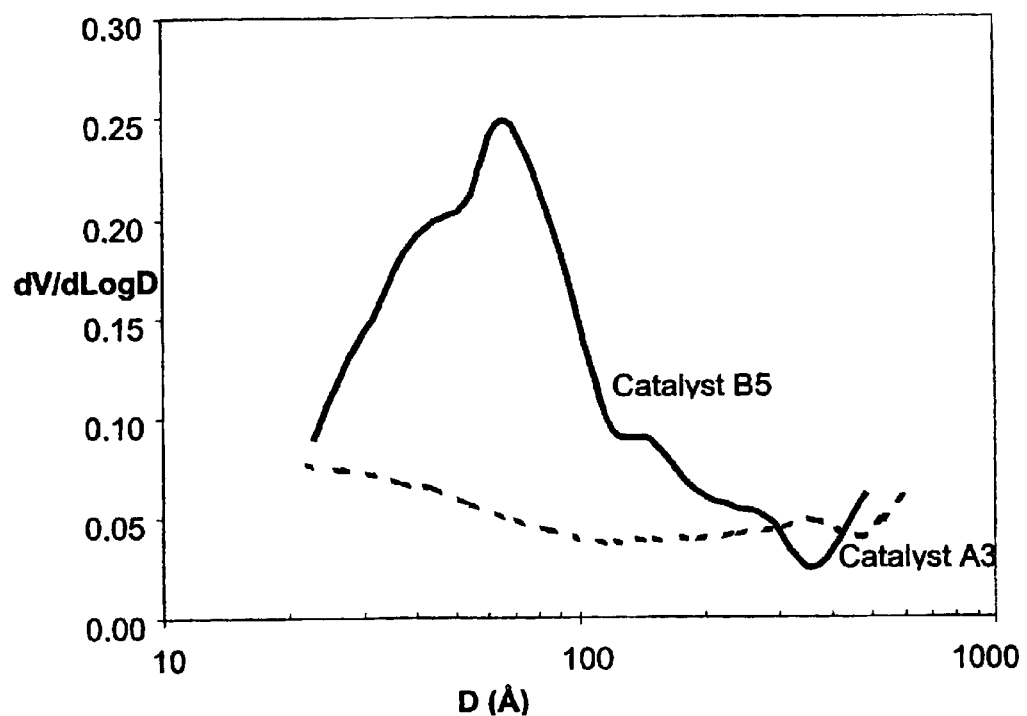
FIG. 2 provides plots of the pore size distributions of catalysts A3 and B5 of Example 7.

FIGS. 1 and 2 illustrate the difference in pore size distributions of various cracking catalysts A and B, as measured by nitrogen adsorption. In these figures D stands for the pore diameter and V for the volume of nitrogen adsorbed by the catalyst.

Cracking Catalyst A

Cracking catalyst A preferably comprises 10–70 wt. % of a zeolite, 0–30 wt. % of alumina, 5–40 wt. % of silica, and balance kaolin. More preferably, catalyst A comprises 20–60 wt. % of zeolite, 0–20 wt. % of alumina, 10–40 wt. % of silica, and balance kaolin. Most preferably, catalyst A comprises 30–50 wt. % of zeolite, 0–20 wt. % of alumina, 10–30 wt. % of silica, and balance kaolin.

Cracking catalyst A can be any conventional FCC catalyst comprising a zeolite and a matrix. The matrix typically contains silica, alumina, silica-alumina, and/or clay. A preferred clay is kaolin. The zeolite is preferably a faujasite, optionally ultrastabilized and/or rare earth exchanged, i.e. zeolite Y, zeolite USY, zeolite REY, or zeolite REUSY. Catalyst A can further comprise any other component commonly used in FCC catalysts.

Catalyst A can be prepared in any conventional way to prepare FCC catalysts comprising the above components.

Cracking Catalyst B

Catalyst B preferably comprises 0–50 wt. % of zeolite, 0–70 wt. % of alumina, 5–40 wt. % of silica, 0–15 wt. % of rare earth metal oxide, and balance kaolin. More preferably, catalyst B comprises 1–30 wt. % of zeolite, 10–70 wt. % of alumina, 5–35 wt. % of silica, 0–15 wt. % of rare earth metal oxide, and balance kaolin. Even more preferably, catalyst B comprises 5–15 wt. % of zeolite, 15–55 wt. % of alumina, 10–30 wt. % of silica, 1–15 wt. % of rare earth metal oxide, and balance kaolin.

If catalyst B comprises a molecular sieve, it can be a zeolite like zeolite Y, zeolite USY, or a ZSM-type zeolite such as ZSM-5, a silicium aluminium phosphate (SAPO), an aluminiumphosphates (ALPO), or combinations thereof. Preferably, catalyst B comprises at least one of the above zeolites, more preferably a rare earth exchanged zeolite. Even more preferably, catalyst B is an FCC catalyst suitable for the conversion of heavy feeds. Such catalysts generally comprise a higher amount of alumina and less zeolite than usual FCC catalysts. Therefore, it is preferred that catalyst B comprises a higher amount of alumina and less zeolite than catalyst A.

Catalyst B is preferably impregnated with a rare earth metal compound, resulting in rare earth metal oxide ($RE_2O_3$)-containing cracking catalyst B. Suitable rare earth metals are La, Ce, Nd, Pr, and mixtures thereof.

Cracking catalyst B can be prepared according to the procedure disclosed in Brazilian Patent application BR 9704925-5A. This document describes the preparation of FCC catalysts using a pore-forming agent to control the porosity of the catalyst. A preferred pore-forming agent is a water-soluble carbohydrate, e.g. sucrose, maltose, cellobiose, lactose, glucose, or fructose, which is readily removed after the catalyst preparation. Thermogravimetric analyses indicate that the pore-forming agent can be almost completely removed since less than 5 wt. % of the residual pore-forming agent remains in the catalyst.

Other Components

It is further noted that besides Catalysts A and B the cracking catalyst composition can contain additional components, e.g. additional metal scavenging additives, or an additional cracking catalyst. For example, the cracking catalyst composition may comprise a zeolite Y-containing catalyst A, a cracking catalyst B, and a catalyst which contains a zeolite that enhances the octane number, e.g. ZSM-5.

Fluid Catalytic Cracking

The cracking catalyst composition according to the invention is especially useful in FCC units that operate with heavy hydrocarbon feeds containing high concentrations of contaminant metals. Examples of such feeds are atmospheric distillation residues (ADR), vacuum residues (VR) having boiling points higher than 570° C., heavy vacuum gas oil (HVGO), and mixtures thereof.

In a fluid catalytic cracking unit, the hydrocarbon feed, atomized and vaporized at temperatures between 490° and 560° C., contacts the cracking catalyst composition according to the invention, thereby forming a suspension of the catalyst composition in atomized/vaporized feed and cracked products that flows through a vertical reactor—the reaction zone of the unit—where the cracking reactions occur. The reaction zone is generally an elongated vertical tube in which the flow is directed upwards (riser) or downwards (downer). The residence time of the suspension of the catalyst composition atomized/vaporized feed and cracked products in the reaction zone is around 0.3 to 8 seconds.

The catalyst composition is subsequently separated from the conversion products, steam stripped and regenerated in an oxidising atmosphere at temperatures higher than 640° C. The regenerated catalyst composition is recycled to the reactor to contact a fresh feed of heavy hydrocarbon.

The above conditions whereby hydrocarbon feed is contacted with the catalyst composition are referred to as "catalytic cracking conditions".

EXAMPLES

General Test Procedure: the Microactivity Test

The microactivity test (MAT) is a generally accepted way of testing the FCC cracking activity of catalysts.

In the following Examples, this test was carried out in a confined fluid bed ACE-unit, model R+, made by Xytel and Kayser Technology. The ACE-unit comprises a confined fluidized bed reactor containing the catalyst sample. On this sample a known amount of the hydrocarbon feed was injected. After contacting the catalyst with the feed the catalyst was regenerated. The reaction temperature used in all tests was 535° C., the feed flow rate 1.2 g/min and the regeneration temperature 695° C.

The test was conducted using different catalyst/feed ratios. These ratios were obtained by varying the injection time of the feed between 50 and 150 seconds, yielding catalyst/feed ratios between 3 and 10.

The conversion, considered as the microactivity (MAT), is defined as the weight percent of the feed converted into coke, gas and gasoline. The light cycle oil (LCO) fraction was not considered as a product, so that the conversion is equal to [100−(LCO+Residue)].

The feed used was a heavy Brazilian gas oil with a high nitrogen and Conradson carbon content, resulting in severe catalyst test conditions. Table 1 shows the particulars of this feed.

TABLE 1

| Physical and chemical properties of the Brazilian gas oil used | |
|---|---|
| API | 18.6 |
| Density 20/4° C. (g/ml) | 0.9391 |

TABLE 1-continued

Physical and chemical properties of the Brazilian gas oil used

| | |
|---|---|
| Aniline point (ppm) | 93.2 |
| Total Nitrogen (ppm) | 3069 |
| Basic Nitrogen(ppm) | 1001 |
| Ramsbottom Carbon Residue (% w) | 0.58 |
| Insoluble in n-heptane (% w) | <0.1 |
| Sulfur (% w) | 0.63 |
| Polyaromatics (% w) | 29 |
| Kinematic Viscosity (ASTM D445) (cS 60° C. | 95.95 |
| Initial Boiling Point, IBP (° C.) | 325 |
| Final Boiling Point, FBP (° C.) | 588 |
| Ni (ppm) | <1 |
| V (ppm) | <1 |
| Na (ppm) | <1 |

Example 1

This Example illustrates the preparation of several cracking catalysts.

Catalyst A1 comprised 43 wt. % rare earth exchanged Y-zeolite, 5 wt. % $Al_2O_3$, silica, and kaolin as balance. This catalyst was prepared as follows:

38.0 kg of a silica hydrosol (7.5 wt. % $SiO_2$) was prepared by controlled neutralization under acidic pH of a sodium silicate solution (29% $SiO_2$, 9% $Na_2O$), using a diluted sulfuric acid solution. To the freshly prepared hydrosol 4.0 kg of powdered kaolin was added under thorough agitation of the resulting suspension. Subsequently, 2.4 kg of an acidic boehmite suspension was added, followed by 16.0 kg of an acidic suspension of rare-earth exchanged Y-zeolite. The resulting precursor suspension had a solids content of 20 wt. %.

The precursor suspension was submitted to a high-shear atomizer, i.e. a colloidal mill, and then spray-dried using a spray-dryer operating at an inlet temperature of 445° C. and an outlet temperature of 135° C., a flow rate of 4 kg/min and an atomizer rotation of 13,500 rpm.

6.0 kg of the spray-dried product was re-suspended in aqueous ammonia and filtered under vacuum. The formed filter cake was exchanged with ammonium sulfate and washed with water. Finally, the catalyst was dried in an air-circulating oven at 110° C. for 16 hours.

Catalyst $A_{ref}$ comprised 35 wt. % rare earth exchanged Y-zeolite, 10 wt. % $Al_2O_3$, silica and kaolin as balance. This catalyst was prepared in the same way as catalyst A1, except for the concentrations of zeolite, alumina, silica and kaolin.

Catalyst B1 comprised 5 wt. % rare earth exchanged Y-zeolite, 25 wt. % $Al_2O_3$, silica, and kaolin as balance. This catalyst was prepared according to the same procedure as catalyst A1, using 12.7 kg of silica hydrosol (7.5 wt. % $SiO_2$), 14.0 kg of powdered kaolin, 32.4 kg of acidic boehmite suspension, and 2.0 kg of rare-earth exchanged Y-zeolite acidic suspension. To the precursor suspension 3.6 kg of sucrose solution was added.

The spray-dried product showed a slightly darker color than catalyst A1. This was propably due to caramelisation of sucrose. The color of the final catalyst B1, however, was similar to that of catalyst A1. Thermogravimetric tests indicated that nearly 98% of the sucrose was removed during the washing step.

The chemical composition and some physical properties of the above catalysts are presented in Table 2. In this Table ABD stands for the Apparent Bulk Density, which is defined as the mass of catalyst per unit of volume in a non-compacted bed. The ABD is measured after filling a gauged cylinder of fixed, pre-determined volume without compaction of the bed. D50 stands for the average particle diameter. The diameter of 50% of the catalyst particles is below this value. The D50 was determined by laser light scattering of catalyst suspensions, using a Malvern 2600.

TABLE 2

| Catalyst | $A_{ref.}$ | A1 | B1 |
|---|---|---|---|
| Y-zeolite (%) | 35 | 43 | 5 |
| Alumina (%) | 10 | 5 | 25 |
| Silica (%) | 20 | 24 | 8 |
| Kaolin (%) | 35 | 28 | 62 |
| ABD (g/ml) | 0.80 | 0.72 | 0.84 |
| Pore volume. $H_2O$ (ml/g) | 0.27 | 0.33 | 0.25 |
| D50 (micron) | 78 | 83 | 81 |
| BET Surface (m$^2$/g) | 242 | 247 | 156 |
| Micropore volume(ml/g) | 0.082 | 0.095 | 0.011 |
| Pore Volume 20–200Å (ml/g) | 0.058 | 0.032 | 0.123 |
| $SiO_2$ (%) | 62.6 | 67.9 | 45.3 |
| $Al_2O_3$ (%) | 33.2 | 26.7 | 51.9 |
| $Na_2O$ (%) | 0.35 | 0.53 | <0.05 |
| $RE_2O_3$ (%) | 2.42 | 3.31 | 0.72 |

Table 2 clearly shows the larger pore volume of catalyst B1 in the pore diameter range 20–200 Å, relative to that of catalysts A1 and $A_{ref}$. In fact, the pore volume of catalyst B1 in this range is 3.8 times larger than the pore volume of catalyst A1 in the same range.

The lower value for the micropore volume of catalyst B correlates with the lower zeolite content, which is the main source of pores with diameters smaller than 20 Å.

The different pore structures of catalysts A1 and B1 are also evident from FIG. 1, showing the nitrogen adsorption of the two catalysts versus the pore diameter.

Example 2

This Example shows the behaviour of cracking catalyst compositions in the presence of high vanadium contents.

Cracking catalyst compositions were prepared from the following cracking catalysts, already described in Example 1:
catalyst A1,
catalyst B1, and
catalyst B1 impregnated with 8 wt. % rare-earth metals (catalyst B1RE).

Cracking catalyst compositions according to the invention were prepared by mixing 75 wt. % of catalyst A with 25 wt. % of catalyst B1 or catalyst B1RE.

The cracking catalyst compositions were subsequently mixed with FCC-V, which served as vanadium source. FCC-V is a conventional FCC catalyst impregnated with 2 wt. % of vanadium according to the well-known method for impregnating FCC catalysts taught by B. R. Mitchell in "Industrial and Engineering Chemistry—Product Research and Development", vol. 19, pages 209–213 (1980).

The resulting catalyst mixture comprised 56 wt. % of catalyst A1, 19 wt. % of either catalyst B1 or B1RE, and 25 wt. % of FCC-V.

In order to be able to separate the catalysts after the test and analyse their vanadium content, the catalysts were used in two different sieve fractions: >53 microns (270 mesh) and <43 microns (325 mesh). The <43 micron fraction of FCC-V and the >53 micron fraction of catalysts B1 and B1RE fraction were used. The applied sieve fraction of catalyst A1 varied with the experiment.

The catalyst mixtures were deactivated for 5 hours at 788° C. using 100% steam in order to enable vanadium migration. The catalyst mixture was subsequently sieved and the vanadium content of the >53 micron fraction was measured with X-ray fluorescence spectroscopy (XRF). The vanadium content in the >53 micons fraction of the different cracking catalyst compositions is presented in Table 3.

TABLE 3

| Exp. nr. | Catalyst mixture |  | >53 micron fraction | V-content (ppm) |
|---|---|---|---|---|
| 1 | A1, <43 microns B1 | FCC-V | B1 | 3900 |
| 2 | A1, >53 microns B1 | FCC-V | A1 + B1 | 2800 |
| 3 | A1, <43 microns B1RE | FCC-V | B1RE | 8100 |
| 4 | A1, >53 microns B1RE | FCC-V | A1 + B1RE | 2600 |

The results of Table 3 show the higher vanadium scavenging potential of catalysts B1 and B1RE, which possess a higher porosity in the 20–200 Å pore diameter range than catalyst A1.

The BET surface area and the micropore volume of the cracking catalyst compositions before and after the above experiments 2 and 4 are presented in Table 4, together with the data of a >53 micron fraction of catalyst $A_{ref}$ which underwent the same deactivation procedure in the presence of catalyst FCC-V as the cracking catalyst compositions used in experiments 1–4.

The BET surface and the micropore volume where both calculated from the adsorption isotherms. For the determination of the BET surface, the well-known BET method was used; for the determination of the micropore volume the t-plot method of Harkins and Jura was used in the range 3.3–5.4 nm. For these determinations, the Micrometrics ASAP 2400 was used. The samples were pre-treated at 600° C. under vacuum for 1 hour.

TABLE 4

|  | $A_{ref}$ | A1 + B1 (exp. 2) | A1 + B1RE (exp. 4) |
|---|---|---|---|
| Before deactivation: |  |  |  |
| BET surface (m²/g) | 242 | 225 | 217 |
| Micropore vol.(ml/g) | 0.082 | 0.074 | 0.075 |
| After deactivation: |  |  |  |
| BET surface (m²/g) | 73 | 81 | 90 |
| Micropore vol. (ml/g) | 0.025 | 0.028 | 0.033 |
| Retention (%): |  |  |  |
| BET surface | 30 | 36 | 41 |
| Micropore vol. | 30 | 38 | 44 |

The data presented in Table 4 illustrate a better retention of the textural properties of the cracking catalyst compositions according to the invention compared to that of the reference catalyst $A_{ref}$. Furthermore, the presence of rare earth in catalyst B further improves the preservation of the texture.

Example 3

This Example illustrates the activity of cracking catalyst compositions according to the invention using the microactivity test. Different catalyst/feed ratios, ranging from 3 to 10, were used in this test.

The cracking catalyst compositions of Example 2 and reference catalyst $A_{ref}$ were tested after severe steam deactivation in the presence and in the absence of a vanadium source (catalyst FCC-V). For the conditions we refer to Example 2. The results are presented in Table 5A, B, and C. In Table 5A, the conversion of the catalyst compositions is compared at equal catalyst/feed ratio. Table 5B compares the products formed at equal conversion (iso-conversion), and Table 5C compares the conversion and the gasoline and residuum concentrations at equal coke-formation (iso-coke).

TABLE 5A

|  | Deactivated without V | | Deactivated in the presence of V | | |
|---|---|---|---|---|---|
|  | $A_{ref}$ | A1 + B1 | $A_{ref}$ | A1 + B1 | A1 + B1RE |
| Catalyst/feed ratio | 7.0 | 7.0 | 5.0 | 5.0 | 5.0 |
| Conversion (wt. %) | 59.7 | 62.0 | 40.0 | 48.9 | 48.0 |

TABLE 5B

|  | Deactivated without V | | Deactivated in the presence of V | | |
|---|---|---|---|---|---|
|  | $A_{ref}$ | A1 + B1 | $A_{ref}$ | A1 + B1 | A1 + B1RE |
| Iso-conversion (wt. %) | 60 | 60 | 48.0 | 48.0 | 48.0 |
| Fuel gas (wt. %) | 1.7 | 2.0 | 1.9 | 2.1 | 2.0 |
| Hydrogen (wt. %) | 0.03 | 0.04 | 0.27 | 0.29 | 0.21 |
| Coke (wt. %) | 4.4 | 4.7 | 6.0 | 5.5 | 5.0 |
| LPG (wt. %) | 12.9 | 13.4 | 7.6 | 7.8 | 8.3 |
| Propylene (wt. %) | 3.5 | 3.3 | 2.2 | 2.2 | 2.3 |
| Gasoline (wt. %) | 41.0 | 40.0 | 32.5 | 32.6 | 32.7 |
| Light Cycle Oil (wt. %) | 14.1 | 12.6 | 15.8 | 16.9 | 15.9 |
| Residuum (wt. %)* | 25.9 | 27.4 | 36.2 | 35.1 | 36.1 |
| Delta coke atalyst) | 0.60 | 0.80 | 0.7 | 1.2 | 1.0 |

TABLE 5C

|  | Deactivated without V | | Deactivated in the presence of V | | |
|---|---|---|---|---|---|
|  | $A_{ref}$ | A1 + B1 | $A_{ref}$ | A1 + B1 | A1 + B1RE |
| Iso-coke (wt. %) | 4.5 | 4.5 | 5.5 | 5.5 | 5.5 |
| Conversion (wt. %) | 60.3 | 59.4 | 45.8 | 47.8 | 50.0 |
| Gasoline (wt. %) | 41.0 | 40.0 | 31.3 | 32.5 | 33.8 |
| Residuum (wt. %) | 25.5 | 27.9 | 38.1 | 35.2 | 34.5 |

The results of Table 5 after deactivation in the absence of the vanadium source show that there are no large differences between the activity and selectivity of the cracking catalyst composition according to the invention and the reference catalyst $A_{ref}$, although it is noted that the composition according to the invention is slightly more active.

The table further illustrates that after deactivation in the presence of vanadium the cracking catalyst compositions according to the invention show better performance than reference catalyst $A_{ref}$, i.e. a higher conversion without concessions to the selectivity. With the compositions comprising rare earth-containing catalyst B even a reduction of the coke and hydrogen formation is obtained.

Example 4

In this Example, the following catalysts were used:

Catalyst B2, comprising 25 wt. % silica, 50 wt. % active alumina, and kaolin as balance, prepared according to the preparation procedure for catalyst B1, using a pore-forming agent (see Example 1), except for the amounts of silica, alumina, and kaolin and the absence of zeolite in this catalyst.

Catalyst B3, comprising 25 wt. % silica, 30 wt. % active alumina, and kaolin as balance, prepared according to the preparation procedure for catalyst B1, using a pore-forming agent (see Example 1), except for the amounts of silica, alumina, and kaolin and the absence of zeolite in this catalyst.

Catalyst B4, having the same composition as catalyst B2, but prepared without using a pore-forming agent. So, this catalyst is prepared according to the preparation procedure for catalyst A1 (see Example 1), except for the amounts of silica, alumina, and kaolin and the absence of zeolite in this catalyst.

Catalyst A2, comprising 50 wt. % of Y-zeolite, 25 wt. % of silica, and kaolin as balance.

Catalyst FCC, a commercial catalyst comprising 35 wt. % rare-earth-exchanged Y-zeolite, 10 wt. % alumina, silica, and kaolin as balance.

The pore volume in the pore diameter range 20–200 Å of these catalysts is listed in Table 6.

TABLE 6

| Catalyst | Pore Volume in range 20–200 Å (ml/g) |
|---|---|
| B2 | 0.196 |
| B3 | 0.179 |
| B4 | 0.123 |
| FCC | 0.061 |

Cracking catalyst compositions according to the invention were prepared from 1:1 mixtures of the <43 micron fraction of catalyst A2 and the >53 micron fraction of catalyst B2, B3, or B4 and from 2:1 mixtures of the <43 micron fraction of catalyst FCC and the >53 micron fraction of catalyst B2 or B4.

These cracking catalyst compositions were deactivated in the presence of vanadium according to Example 2. The V-source was again catalyst FCC-V, i.e. catalyst FCC impregnated with 2% vanadium, of which the <43 micron fraction was used. After deactivation, the V-content of the >53 micron fraction was measured. Table 7 shows the results of the tests.

TABLE 7

| Exp. Nr. | Catalyst mixture | | | V content (ppm) >53 microns |
|---|---|---|---|---|
| | >53 microns | <43 microns | <43 microns | |
| 1 | 37.5% B2 | 37.5% A2 | 25% FCC-V | 5600 |
| 2 | 37.5% B3 | 37.5% A2 | 25% FCC-V | 4200 |
| 3 | 37.5% B4 | 37.5% A2 | 25% FCC-V | 3000 |
| 4 | 25% B2 | 50% FCC | 25% FCC-V | 6000 |
| 5 | 25% B4 | 50% FCC | 25% FCC-V | 4600 |

Table 7 shows that catalyst B2 has the highest metal scavenging ability, followed by catalysts B3 and B4. This indicates that the larger the difference in pore volume between catalyst A and catalyst B in the pore diameter range 20–200 Å, the better the vanadium scavenging by catalyst B.

Example 5

Cracking catalyst compositions were prepared from 1:1 mixtures of (a) different sieve fractions of catalyst A2, (b) different sieve fractions of catalyst B2, (c) catalyst A2 and catalyst B2.

After deactivation in the presence of FCC-V (see Example 2) the V-content of the >53 micron fraction was measured. The results are presented in Table 8.

TABLE 8

| Exp. Nr. | Catalyst mixture | | | V content (ppm) >53 microns |
|---|---|---|---|---|
| | 37.5% >53 microns | 37.5% <43 microns | 25% <43 microns | |
| 1 | A2 | A2 | FCC-V | 2800 |
| 2 | B2 | B2 | FCC-V | 4800 |
| 3 | A2 | B2 | FCC-V | 1100 |
| 4 | B2 | A2 | FCC-V | 5600 |

From experiments 1 and 3 it is clear that the presence of catalyst B2 results in a reduction of vanadium contamination in catalyst A2.

These data furthermore show that the vanadium scavenging properties of catalysts B are not only the result of its particle size: both >53 micron and <43 micron fractions of catalyst B2 have good metal scavenging properties.

Example 6

In this experiment the following catalysts were used:

Catalyst B3, comprising 25 wt. % silica, 30 wt. % active alumina, and balance kaolin. This catalyst was impregnated with lanthanum chloride or RE, i.e. a mixture of rare earth metal compounds mainly comprising Ce and La, resulting in catalysts with 11 wt. % of $RE_2O_3$ (catalyst B3RE), or 11 wt. % $La_2O_3$ (catalyst B3La).

Catalyst A3, comprising 45 wt. % USY exchanged with 3 wt. % $RE_2O_3$, silica, alumina, and balance kaolin.

Catalyst A4, comprising 35 wt. % USY exchanged with 12 wt. % $RE_2O_3$, silica, alumina, and balance kaolin.

The formulations of catalysts A3 and A4 are common for conventional FCC catalysts.

Cracking catalyst compositions were prepared from 3:1 mixtures of catalyst A3 and catalyst B3RE or B3La.

Deactivation experiments in the presence of vanadium were conducted as in Example 2. Table 9 lists the BET surface area of catalyst A4 and the cracking catalyst compositions after deactivation. The surface area retention, i.e. the surface area after deactivation relative to the surface area before deactivation, is also displayed in this table.

TABLE 9

| Catalyst mixtures | | | BET ($m^2/g$) | surface Retention (%) |
|---|---|---|---|---|
| 58.2% A3 | 16.8% B3RE | 25% FCC-V | 123 | 43 |
| 58.2% A3 | 16.8% B3La | 25% FCC-V | 129 | 45 |
| 75% A4 | — | 25% FCC-V | 102 | 36 |

The results clearly show the larger surface area retention of the cracking catalyst compositions according to the invention compared to a cracking catalyst A4.

Example 7

In this experiment the following catalysts were used:

Catalyst B5, comprising 20 wt. % of boehmite alumina, 5 wt. % of silica, and balance kaolin. The catalyst is optionally impregnated with a rare earth compound, resulting in 5 wt. % of $RE_2O_3$ (catalyst B5RE).

In contrast to the other catalysts used in the Examples of this specification, of which the silica was prepared by neutralization of a sodium silicate solution, the silica of this catalyst was prepared by ion-exchange of a silica sol using a cation-exchange resin. A method of preparing such an ion-exchanged silica sol is disclosed in U.S. Pat. No. 3,649,556. This ion-exchange procedure results in silica hydrosols with larger particle size than the silica hydrosols obtained by neutralisation of sodium silicate.

Catalyst A3, comprising 45 wt. % USY exchanged with 3 wt. % $RE_2O_3$, silica, alumina, and balance kaolin.

Cracking catalyst compositions were prepared using these catalysts, which were deactivated in the presence of vanadium as described in Example 2. Again, different catalyst fractions were used and the V-content of the >53 microns was measured after deactivation.

TABLE 10

| Catalyst mixture | | | |
|---|---|---|---|
| >53 microns | <43 microns | <43 microns | V content (ppm) >53 microns |
| 19% A3 | 56% A3 | 25% FCC-V | 2600 |
| 19% B5 | 56% A3 | 25% FCC-V | 3500 |
| 56% A3 | 19% B5RE | 25% FCC-V | 2000 |
| 19% B5RE | 56% A3 | 25% FCC-V | 4000 |

The results of Table 10 above clearly show the positive effect of rare earth on vanadium scavenging by catalyst B5.

FIG. 2 illustrates the pore size distribution of catalysts B5 and A3, obtained by nitrogen adsorption. It is clear that catalyst B5 has a larger pore volume in the pore diameter range 20–200 Å than catalyst A3. The pore volume of catalyst B5 in this specific pore diameter range was 0.153 ml/g, while the pore volume of A3 in the same range was 0.059 ml/g. So, the pore volume of catalyst B5 in the specific pore diameter range was 2.6 times higher than that of catalyst A3.

Example 8

Microactivity tests were performed according to Example 3, now using catalyst A4 (see Example 6) and cracking catalyst compositions according to the invention comprising a 3:1 mixture of catalyst A3 and catalyst B5RE (see Example 7).

Before performing the microactivity test, catalyst A4 and the cracking catalyst compositions were deactivated with steam in the presence of a vanadium source (FCC-V); see Example 2. For this purpose, catalyst mixtures of 25 wt. % of catalyst FCC-V and 75 wt. % of catalyst A4 or the cracking catalyst composition were prepared.

Tables 11A, B, and C below lists the results of the tests. In Table 11A, the conversion of the catalyst compositions is compared at equal catalyst/feed ratio. Table 11B compares the products formed at equal conversion (iso-conversion), and Table 11C compares the conversion and the gasoline and residuum concentrations at equal coke-formation (iso-coke).

TABLE 11A

| | After deactivated in the presence of V: | | |
|---|---|---|---|
| | A4 | A3 + B5RE | A3 + B5 |
| Catalyst/feed ratio | 5.0 | 5.0 | 5.0 |
| Conversion (wt. %) | 56.5 | 64.0 | 57.7 |

TABLE 11B

| | After deactivated in the presence of V: | | |
|---|---|---|---|
| | A4 | A3 + B5RE | A3 + B5 |
| Iso-conversion (wt. %) | 60.0 | 60.0 | 60.0 |
| Fuel gas (wt. %) | 2.4 | 2.2 | 2.4 |
| Hydrogen (wt. %) | 0.47 | 0.31 | 0.46 |
| Coke (wt. %) | 4.6 | 3.2 | 4.3 |
| LPG (wt. %) | 8.0 | 8.1 | 7.4 |
| Propylene (wt. %) | 2.4 | 2.5 | 2.2 |
| Gasoline (wt. %) | 45.0 | 46.5 | 46.0 |
| Light Cycle Oil (wt. %) | 18.8 | 18.8 | 18.5 |
| Residuum (wt. %) | 21.2 | 23.2 | 21.5 |
| Delta coke atalyst) | 0.87 | 0.71 | 0.82 |

TABLE 11C

| | After deactivated in the presence of V: | | |
|---|---|---|---|
| | A4 | A3 + B5RE | A3 + B5 |
| Iso-coke (wt. %) | 4.0 | 4.0 | 4.0 |
| Conversion (wt. %) | 51.8 | 66.8 | 56.6 |
| Gasoline (wt. %) | 39.6 | 49.9 | 43.8 |
| Residuum (wt. %) | 29.8 | 17.1 | 24.8 |

The results of Tables 11A, B, and C indicate a better performance of the cracking catalyst compositions according to the invention relative to a typical FCC catalyst (catalyst A4) after deactivation in the presence of vanadium. It is also clear that the use of cracking catalyst compositions comprising a rare-earth metal-containing catalyst B gives even better results.

What is claimed is:

1. A cracking catalyst composition comprising a physical mixture as separate particles of 10–90 weight % of a cracking catalyst A and 90–10 weight % of a cracking catalyst B, whereby catalyst A is a zeolite-containing cracking catalyst, and catalyst B is a catalyst having a higher average pore volume in the pore diameter range of 20–200 Å than catalyst A in the same pore diameter range, said composition not containing M41S material.

2. The cracking catalyst composition of claim 1 wherein the average pore volume of cracking catalyst B in the pore diameter range of 20–200 Å is 1.5–6 times higher than the average pore volume of cracking catalyst A in the same pore diameter range.

3. The cracking catalyst composition of claim 1 wherein the average pore volume of cracking catalyst B in the pore diameter range of 20–200 Å is 0.1–0.4 ml/g.

4. The cracking catalyst composition of claim 1 wherein cracking catalyst A comprises 10–70 wt. % of a zeolite, 0–30 wt. % of alumina, 5–40 wt. % of silica, and balance kaolin.

5. The cracking catalyst composition of claim 4 wherein the zeolite is selected from zeolite Y, zeolite USY, a rare earth metal exchanged zeolite Y, and a rare earth metal exchanged zeolite USY.

6. The cracking catalyst composition of claim 1 wherein cracking catalyst B comprises 0–50 wt. % of a zeolite, 0–70 wt. % alumina, 5–40 wt. % of silica, 0–15 wt. % of rare earth metal oxide, and balance kaolin.

7. The cracking catalyst composition of claim 6 wherein cracking catalyst B comprises 5–15 wt. % zeolite.

8. The cracking catalyst composition of claim 1 wherein cracking catalyst B comprises 1–15 wt. % of rare earth metal oxide.

9. A fluid catalytic cracking process wherein a hydrocarbon feed is contacted with the cracking catalyst composition of claim 1 at catalytic cracking conditions.

10. The fluid catalytic cracking process of claim 9 wherein said hydrocarbon feed has a high metal content.

11. The fluid catalytic cracking process of claim 10, wherein said metal is vanadium.

* * * * *